United States Patent
Hokoi et al.

(10) Patent No.: US 10,442,424 B2
(45) Date of Patent: Oct. 15, 2019

(54) HYBRID VEHICLE

(71) Applicant: Toyota Jidosha Kabushiki Kaisha, Toyota-shi, Aichi-ken (JP)

(72) Inventors: Koji Hokoi, Toyota (JP); Koji Yoshihara, Kariya (JP); Koji Yamamoto, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 240 days.

(21) Appl. No.: 15/369,141

(22) Filed: Dec. 5, 2016

(65) Prior Publication Data
US 2017/0158188 A1    Jun. 8, 2017

(30) Foreign Application Priority Data

Dec. 7, 2015 (JP) .................................. 2015-238451

(51) Int. Cl.
| | |
|---|---|
| *B60W 20/10* | (2016.01) |
| *B60K 6/26* | (2007.10) |
| *B60K 6/28* | (2007.10) |
| *B60K 6/365* | (2007.10) |
| *B60K 6/383* | (2007.10) |

(Continued)

(52) U.S. Cl.
CPC ............ *B60W 20/10* (2013.01); *B60K 6/26* (2013.01); *B60K 6/28* (2013.01); *B60K 6/365* (2013.01); *B60K 6/383* (2013.01); *B60K 6/445* (2013.01); *B60L 15/20* (2013.01); *B60L 50/16* (2019.02); *B60L 50/61* (2019.02); *B60W 10/02* (2013.01); *B60W 10/06* (2013.01); *B60W 10/08* (2013.01); *B60W 20/19* (2016.01); *B60W 20/40* (2013.01); *B60K 6/387* (2013.01); *B60K 2006/262* (2013.01); *B60K 2006/381* (2013.01); *B60L 2210/10* (2013.01); *B60L 2210/30* (2013.01); *B60L 2250/26* (2013.01); *B60L 2260/26* (2013.01); *B60W 20/00* (2013.01); *B60W 2520/10* (2013.01); *B60W 2540/10* (2013.01); *B60W 2540/106* (2013.01); *B60Y 2200/92* (2013.01); *Y02T 10/48* (2013.01); *Y02T 10/6217* (2013.01); *Y02T 10/6239* (2013.01); *Y02T 10/6286* (2013.01); *Y02T 10/645* (2013.01); *Y02T 10/7005* (2013.01);

(Continued)

(58) Field of Classification Search
None
See application file for complete search history.

(56) References Cited

U.S. PATENT DOCUMENTS

| | | | |
|---|---|---|---|
| 6,553,287 B1 | 4/2003 | Supina et al. | |
| 8,734,281 B2 * | 5/2014 | Ai ......................... | B60K 6/445 |
| | | | 180/65.21 |

(Continued)

FOREIGN PATENT DOCUMENTS

| | | |
|---|---|---|
| JP | 2003-201880 A | 7/2003 |
| JP | 2008-168700 A | 7/2008 |

(Continued)

Primary Examiner — Nicholas K Wiltey
(74) Attorney, Agent, or Firm — Dinsmore & Shohl LLP (57) ABSTRACT

When an accelerator operating speed is greater than a quick depression threshold value, a start threshold value is set to a value that is smaller than a selection threshold value between a single-drive mode and a double-drive mode in an EV drive mode. Then, when a required torque becomes greater than the start threshold value, an engine is started.

4 Claims, 9 Drawing Sheets

(51) Int. Cl.
  *B60K 6/445* (2007.10)
  *B60W 10/02* (2006.01)
  *B60W 10/06* (2006.01)
  *B60W 10/08* (2006.01)
  *B60W 20/40* (2016.01)
  *B60W 20/19* (2016.01)
  *B60L 15/20* (2006.01)
  *B60L 50/61* (2019.01)
  *B60L 50/16* (2019.01)
  *B60K 6/387* (2007.10)
  *B60W 20/00* (2016.01)
  *B60K 6/38* (2007.10)

(52) U.S. Cl.
  CPC ............ *Y02T 10/7077* (2013.01); *Y02T 10/72* (2013.01); *Y02T 10/7275* (2013.01)

(56) References Cited

U.S. PATENT DOCUMENTS

| | | | | |
|---|---|---|---|---|
| 2011/0109180 A1* | 5/2011 | Akutsu | ............... | B60K 6/448 310/77 |
| 2012/0072066 A1* | 3/2012 | Kato | ............... | B60K 6/365 701/22 |
| 2013/0073154 A1* | 3/2013 | Tanaka | ............... | F16D 48/06 701/54 |
| 2013/0109531 A1* | 5/2013 | Hoshiba | ............... | B60W 10/06 477/52 |
| 2013/0174806 A1* | 7/2013 | Nagakura | ............... | F02B 17/005 123/296 |
| 2014/0210261 A1* | 7/2014 | Morisaki | ............... | B60K 6/445 307/10.1 |
| 2014/0297088 A1* | 10/2014 | Ando | ............... | B60K 6/445 701/22 |
| 2014/0358340 A1* | 12/2014 | Radev | ............... | B60K 6/442 701/22 |
| 2015/0167575 A1* | 6/2015 | Matsumoto | ......... | F02D 41/1495 701/102 |
| 2015/0217758 A1* | 8/2015 | Saiko | ............... | B60K 6/365 477/35 |
| 2015/0219211 A1* | 8/2015 | Schiele | ............... | F16H 63/3026 701/51 |
| 2015/0314685 A1* | 11/2015 | Imamura | ............... | B60L 3/0046 318/504 |
| 2016/0152227 A1 | 6/2016 | Tabata et al. | | |
| 2017/0167591 A1* | 6/2017 | Fujii | ............... | F16H 57/0006 |
| 2017/0167593 A1* | 6/2017 | Fujii | ............... | F16H 57/12 |
| 2017/0217302 A1* | 8/2017 | Imamura | ............... | B60K 6/445 |
| 2017/0274754 A1* | 9/2017 | Imamura | ............... | B60K 6/365 |
| 2017/0282901 A1* | 10/2017 | Imamura | ............... | B60W 20/15 |
| 2017/0327120 A1* | 11/2017 | Oh | ............... | B60W 10/06 |
| 2018/0009432 A1* | 1/2018 | Takagi | ............... | B60K 6/365 |
| 2018/0015916 A1* | 1/2018 | Banshoya | ............... | B60K 6/365 |
| 2018/0022203 A1* | 1/2018 | Banshoya | ............... | B60K 6/365 180/65.235 |
| 2018/0022342 A1* | 1/2018 | Takagi | ............... | B60K 6/365 180/65.23 |
| 2018/0022355 A1* | 1/2018 | Banshoya | ............... | B60K 6/387 477/5 |
| 2018/0086331 A1* | 3/2018 | Sato | ............... | F02D 41/0215 |
| 2018/0170361 A1* | 6/2018 | Uchida | ............... | F16H 61/0031 |
| 2018/0222308 A1* | 8/2018 | Imamura | ............... | B60K 6/365 |
| 2018/0236864 A1* | 8/2018 | Imamura | ............... | B60K 6/365 |

FOREIGN PATENT DOCUMENTS

JP   2015-016789 A   1/2015
WO   2014/090704 A1   6/2014

\* cited by examiner

HYBRID VEHICLE

CROSS-REFERENCE TO RELATED APPLICATIONS

This application claims priority to Japanese Patent Application No. 2015-238451 filed on Dec. 7, 2015, the entire contents of which are hereby incorporated by reference.

BACKGROUND

1. Technical Field

The present disclosure relates to a hybrid vehicle.

2. Description of Related Art

Conventionally, as this type of hybrid vehicle, there has been proposed one in which a generator motor is connected to a sun gear of a planetary gear, an engine is connected to a carrier, a drive shaft is connected to a ring gear, a propulsion motor is connected to the drive shaft, and a one-way clutch that inhibits reverse rotation (negative rotation) of the engine is provided (see, e.g. Japanese Patent Application Publication No. 2003-201880 (JP 2003-201880 A). In this hybrid vehicle, when the maximum acceleration is required during the stop of the engine and the estimated total torque of the propulsion motor and the generator motor is smaller than the maximum total torque of the propulsion motor and the engine, the engine is started.

In the hybrid vehicle of the hardware configuration described above, it is possible to select a so-called double-drive mode in which the vehicle travels by torque from the propulsion motor and torque from the generator motor (torque in a direction of negative rotation of the generator motor) while setting the engine in a rotation restricted state. When starting the engine, the engine is cranked by torque from the generator motor (torque in a direction of positive rotation of the generator motor) so as to be started. Therefore, when starting the engine from the double-drive mode, since the direction of torque from the generator motor is reversed, the direction of torque that is output from the generator motor and acts on the drive shaft is reversed so that there is a possibility that the total torque that is output to the drive shaft may decrease somewhat largely. If such a phenomenon occurs when quick depression of an accelerator pedal is carried out, a driver is likely to feel slowness.

SUMMARY

Therefore, in view of the above-mentioned problems, the present disclosure provides a hybrid vehicle that suppresses making a driver feel slowness when quick depression of an accelerator pedal is carried out.

According to one aspect of the present disclosure, there is provided a hybrid vehicle including an engine, a first motor, a planetary gear set, a second motor, a rotation restriction mechanism, a battery, and an electronic control unit. The planetary gear set includes at least one planetary gear, at least part of rotating elements of the at least one planetary gear being connected to the engine, the first motor and a drive shaft such that the first motor, the engine and the drive shaft are arranged in this order in a nomograph, the drive shaft being coupled to an axle. The second motor is mechanically coupled to the drive shaft. The rotation restriction mechanism is configured to restrict rotation of the engine. The battery is configured to exchange electric power with the first motor and the second motor. The electronic control unit is configured to: (i) control the engine, the first motor, and the second motor in any one of a plurality of drive modes including a hybrid drive mode and an electric drive mode, so as to travel the hybrid vehicle by using a required torque that is required for the drive shaft in response to an accelerator operation amount, the hybrid drive mode being a mode in which the hybrid vehicle travels while the engine is placed in a rotating state to cause the engine to operate, and the electric drive mode being a mode in which the hybrid vehicle travels by using torque from at least the second motor while the engine is placed in a rotation stopped state to cause the engine not to operate, (ii) select a single-drive mode in the electric drive mode when the required torque is smaller than or equal to a selection threshold value smaller than or equal to a first maximum torque that is outputtable to the drive shaft in the single-drive mode, and select a double-drive mode in the electric drive mode when the required torque is larger than the selection threshold value, and, the single-drive mode being a mode in which the hybrid vehicle travels by using torque from only the second motor, and the double-drive mode being a mode in which the hybrid vehicle travels by using torque from the first motor and the second motor, (iii) control the hybrid vehicle so as to crank the engine to be started by using torque from the first motor when the required torque becomes larger than a start threshold value in the electric drive mode, and (iv) set the start threshold value to a value that is smaller than or equal to the selection threshold value when an accelerator operating speed as an increase amount per unit time of the accelerator operation amount is greater than a predetermined speed.

In the hybrid vehicle of the present disclosure described above, in the electric drive mode, between the single-drive mode in which the vehicle travels by only the torque from the second motor and the double-drive mode in which the vehicle travels by the torque (negative torque) from the first motor and the torque from the second motor, the single-drive mode is selected when the required torque that is required to the drive shaft according to the accelerator operation amount is smaller than or equal to the selection threshold value that is smaller than or equal to the first maximum torque that can be output to the drive shaft in the single-drive mode, while the double-drive mode is selected when the required torque is larger than the selection threshold value. When the required torque becomes larger than the start threshold value in the electric drive mode (the single-drive mode or the double-drive mode), the control is performed such that the engine is cranked by the torque (positive torque) from the first motor so as to be started. When the accelerator operating speed as an increase amount per unit time of the accelerator operation amount is greater than the predetermined speed (quick depression of an accelerator pedal is carried out), the start threshold value is set to the value that is smaller than or equal to the selection threshold value. Therefore, when the current drive mode is the single-drive mode, the engine is started from the single-drive mode when the required torque becomes larger than the start threshold value. Consequently, compared to a case where the engine is started from the double-drive mode, it is possible to suppress, when starting the engine, a reduction in total torque that is output to the drive shaft. As a result, it is possible to suppress making a driver feel slowness when quick depression of the accelerator pedal is carried out.

Herein, the "planetary gear set" may include a planetary gear having a sun gear connected to the first motor, a carrier connected to the engine, and a ring gear connected to the drive shaft. The "second motor" may be directly connected to the drive shaft. The "planetary gear set" may include a planetary gear having a sun gear connected to the first motor, a carrier connected to the engine, and a ring gear connected to the drive shaft, and a reduction gear connected to the ring gear. The "second motor" may be mechanically connected to the drive shaft by being connected to the ring gear via the reduction gear. The "planetary gear set" may include a first planetary gear having a first sun gear, a first carrier connected to the drive shaft, and a first ring gear connected to the engine, a second planetary gear having a second sun gear connected to the first motor, a second carrier connected to the drive shaft and the first carrier, and a second ring gear, a clutch that serves to establish connection between the first sun gear and the second ring gear and to release the connection therebetween, and a brake that serves to non-rotatably fix the second ring gear and to rotatably release the second ring gear, and the "second motor" may be mechanically connected to the drive shaft by being connected to the first sun gear.

The "rotation restriction mechanism" may use a one-way clutch that allows positive rotation of the engine and restricts (inhibits) negative rotation of the engine, or may use a brake that serves to non-rotatably fix the engine and to rotatably release the engine.

In the hybrid vehicle described above, the electronic control unit may be configured to set the start threshold value to a value that is larger than the selection threshold value, when the accelerator operating speed is less than or equal to the predetermined speed. With this configuration, the start of the engine can be suppressed.

Further, in the hybrid vehicle described above, the electronic control unit may be configured to set the start threshold value to a value that is larger than a second maximum torque that is output to the drive shaft in the double-drive mode, when the accelerator operating speed is less than or equal to the predetermined speed. With this configuration, the start of the engine can be further suppressed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Now, modes for carrying out the present disclosure will be described with reference to embodiments.

Figure 1:
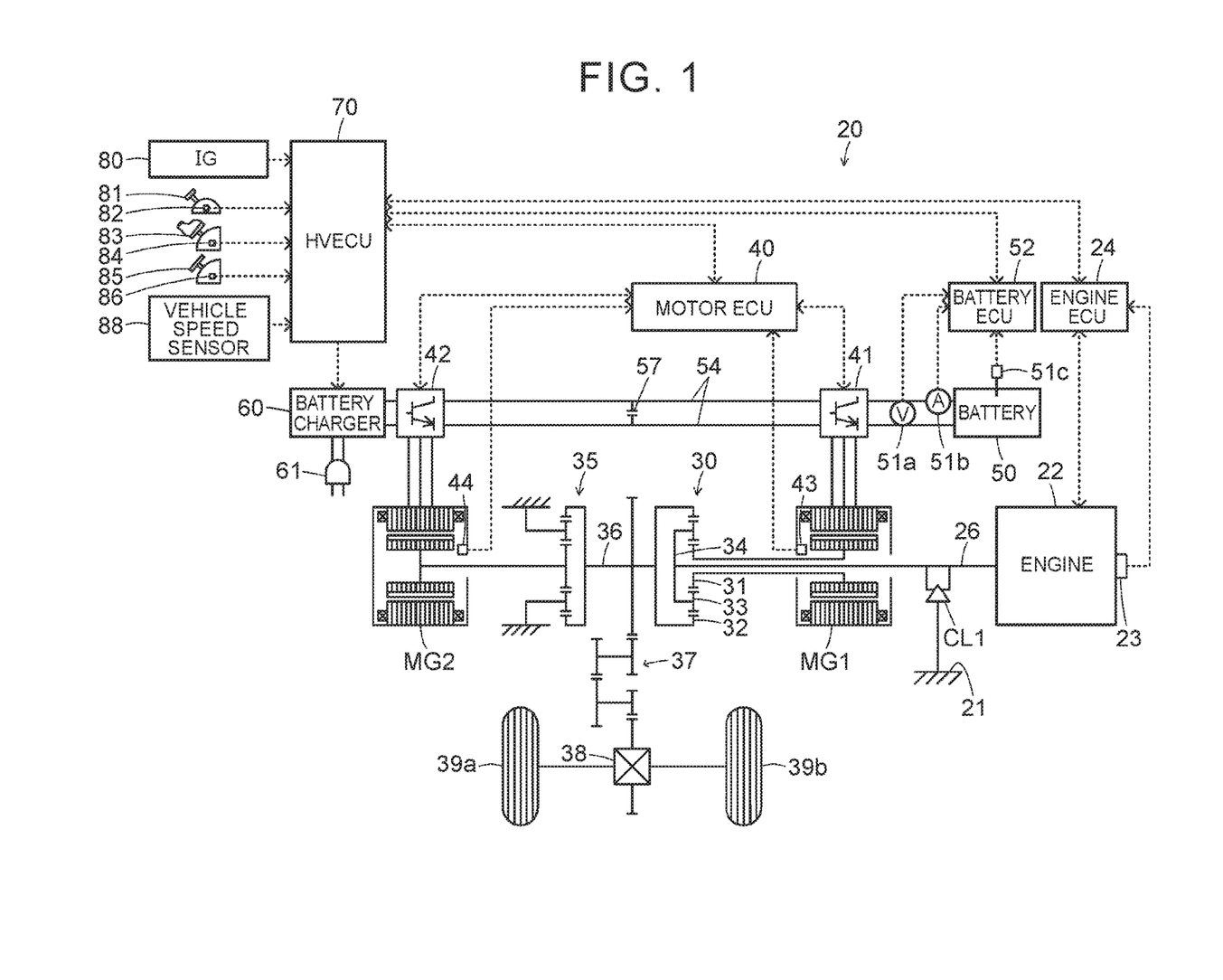
FIG. 1 is a configuration diagram schematically showing a configuration of a hybrid vehicle of a first embodiment as one example of the present disclosure.

FIG. 1 is a configuration diagram schematically showing a configuration of a hybrid vehicle 20 of a first embodiment of the present disclosure. As shown in FIG. 1, the hybrid vehicle 20 of the first embodiment includes an engine 22, a planetary gear 30 as a planetary gear set, a one-way clutch CL1, motors MG1 and MG2, inverters 41 and 42, a battery 50, a battery charger 60, and a hybrid electronic control unit (hereinafter referred to as an "HVECU") 70.

The engine 22 is configured as an internal combustion engine that uses fuel such as gasoline or diesel fuel to output power. The operation of the engine 22 is controlled by an engine electronic control unit (hereinafter referred to as an "engine ECU") 24.

Although not shown, the engine ECU 24 is configured as a microprocessor including a CPU as its main component and, in addition to the CPU, includes a ROM that stores processing programs, a RAM that temporarily stores data, input and output ports, and a communication port.

Signals from various sensors that are necessary for controlling the operation of the engine 22 are input to the engine ECU 24 via the input port. The following can be given as the signals that are input to the engine ECU 24: a crank angle θcr from a crank position sensor 23 that detects a rotational position of a crankshaft 26 of the engine 22; and a throttle opening degree TH from a throttle valve position sensor that detects a position of a throttle valve.

Various control signals for controlling the operation of the engine 22 are output from the engine ECU 24 via the output port. The following can be given as the signals that are output from the engine ECU 24: a drive control signal to a throttle motor that adjusts the position of the throttle valve; a drive control signal to a fuel injection valve; and a drive control signal to an ignition coil that is integrated with an igniter.

The engine ECU 24 is connected to the HVECU 70 via the communication port. The engine ECU 24 controls the operation of the engine 22 based on a control signal from the HVECU 70 and outputs data on an operating state of the engine 22 to the HVECU 70 as needed. The engine ECU 24 computes a rotational speed of the crankshaft 26, i.e. a rotational speed Ne of the engine 22, based on the crank angle θcr from the crank position sensor 23.

The planetary gear 30 is configured as a single-pinion type planetary gear and includes an external-tooth sun gear 31, an internal-tooth ring gear 32, a plurality of pinions 33 meshing with the sun gear 31 and the ring gear 32, and a carrier 34 holding the pinions 33 in such a way as to allow them to rotate on their own axes and around the sun gear 31. A rotor of the motor MG1 is connected to the sun gear 31. A drive shaft 36 coupled to drive wheels 39a and 39b via a differential gear 38 and a gear mechanism 37 is connected to the ring gear 32. The crankshaft 26 of the engine 22 is connected to the carrier 34.

The one-way clutch CL1 is attached to the crankshaft 26 of the engine 22 (the carrier 34 of the planetary gear 30) and to a case 21 fixed to a vehicle body. The one-way clutch CL1 allows positive rotation of the engine 22 relative to the case 21 and restricts (inhibits) negative rotation of the engine 22 relative to the case 21.

The motor MG1 is configured as, for example, a synchronous generator motor, and as described above, the rotor of the motor MG1 is connected to the sun gear 31 of the planetary gear 30. The motor MG2 is configured as, for example, a synchronous generator motor, and a rotor of the motor MG2 is connected to the drive shaft 36 via a reduction gear 35. The inverters 41 and 42 are connected to the battery 50 via an electric power line 54. A smoothing capacitor 57 is connected to the electric power line 54. The motors MG1 and MG2 are rotationally driven by the inverters 41 and 42, respectively, when a plurality of switching elements (not shown) of the inverters 41 and 42 are switching-controlled by a motor electronic control unit (hereinafter referred to as a "motor ECU") 40.

Although not shown, the motor ECU 40 is configured as a microprocessor including a CPU as its main component and, in addition to the CPU, includes a ROM that stores processing programs, a RAM that temporarily stores data, input and output ports, and a communication port.

Signals from various sensors that are necessary for drivingly controlling the motors MG1 and MG2 are input to the motor ECU 40 via the input port. The following can be given as the signals that are input to the motor ECU 40: rotational positions $\theta m1$ and $\theta m2$ from rotational position detection sensors 43 and 44 that respectively detect rotational positions of the rotors of the motors MG1 and MG2; and phase currents from current sensors that detect currents flowing through respective phases of the motors MG1 and MG2.

Switching control signals for the switching elements (not shown) of the inverters 41 and 42 and so on are output from the motor ECU 40 via the output port.

The motor ECU 40 is connected to the HVECU 70 via the communication port. The motor ECU 40 drivingly controls the motors MG1 and MG2 based on control signals from the HVECU 70 and outputs data on driving states of the motors MG1 and MG2 to the HVECU 70 as needed. The motor ECU 40 computes rotational speeds Nm1 and Nm2 of the motors MG1 and MG2 based on the rotational positions $\theta m1$ and $\theta m2$ of the rotors of the motors MG1 and MG2 from the rotational position detection sensors 43 and 44.

The battery 50 is configured as, for example, a lithium-ion secondary battery or a nickel-hydrogen secondary battery and, as described above, is connected to the inverters 41 and 42 via the electric power line 54. The battery 50 is managed by a battery electronic control unit (hereinafter referred to as a "battery ECU") 52.

Although not shown, the battery ECU 52 is configured as a microprocessor including a CPU as its main component and, in addition to the CPU, includes a ROM that stores processing programs, a RAM that temporarily stores data, input and output ports, and a communication port.

Signals from various sensors that are necessary for managing the battery 50 are input to the battery ECU 52 via the input port. The following can be given as the signals that are input to the battery ECU 52: a battery voltage Vb from a voltage sensor 51a disposed between terminals of the battery 50; a battery current Ib (a positive value when discharged from the battery 50) from a current sensor 51b attached to the output terminal of the battery 50; and a battery temperature Tb from a temperature sensor 51c attached to the battery 50.

The battery ECU 52 is connected to the HVECU 70 via the communication port and outputs data on a state of the battery 50 to the HVECU 70 as needed. The battery ECU 52 computes a state of charge SOC based on an integrated value of the battery current Ib from the current sensor 51b. The state of charge SOC is a ratio of the capacity of electric power, that can be discharged from the battery 50, to the full capacity of the battery 50. Further, the battery ECU 52 computes input and output limits Win and Wout based on the computed state of charge SOC and the battery temperature Tb from the temperature sensor 51c. The input limit Win is an allowable charge electric power that can be charged to the battery 50, while the output limit Wout is an allowable discharge electric power that can be discharged from the battery 50.

The battery charger 60 is connected to the electric power line 54 and includes an AC/DC converter and a DC/DC converter. The AC/DC converter converts AC power, supplied from an external electric power source via a power supply plug 61, to DC power. The DC/DC converter converts the voltage of the DC power from the AC/DC converter and supplies the DC power with the converted voltage to the battery 50 side. When the power supply plug 61 is connected to the external electric power source such as the commercial electric power source, the AC/DC converter and the DC/DC converter of the battery charger 60 are controlled by the HVECU 70 so that the electric power from the external electric power source is supplied to the battery 50.

Although not shown, the HVECU 70 is configured as a microprocessor including a CPU as its main component and, in addition to the CPU, includes a ROM that stores processing programs, a RAM that temporarily stores data, input and output ports, and a communication port.

Signals from various sensors are input to the HVECU 70 via the input port. The following can be given as the signals that are input to the HVECU 70: an ignition signal from an ignition switch 80; a shift position SP from a shift position sensor 82 that detects an operating position of a shift lever 81; an accelerator opening degree Acc from an accelerator pedal position sensor 84 that detects a depression amount of an accelerator pedal 83; a brake pedal position BP from a brake pedal position sensor 86 that detects a depression amount of a brake pedal 85; and a vehicle speed V from a vehicle speed sensor 88.

Control signals for the battery charger 60 and so on are output from the HVECU 70 via the output port.

As described above, the HVECU 70 is connected to the engine ECU 24, the motor ECU 40, and the battery ECU 52 via the communication ports and exchanges various control signals and data with the engine ECU 24, the motor ECU 40, and the battery ECU 52.

In the hybrid vehicle 20 of the first embodiment configured as described above, the engine 22 and the motors MG1 and MG2 are controlled such that, in a CD (Charge Depleting) mode or a CS (Charge Sustaining) mode, the vehicle travels using a required torque Tp* of the drive shaft 36, which is based on an accelerator opening degree Acc and a vehicle speed V, in one of a plurality of drive modes including a hybrid drive (HV drive) mode and an electric drive (EV drive) mode.

Herein, the CD mode is a mode that gives priority to the EV drive mode between the HV drive mode and the EV drive mode compared to the CS mode. In the first embodiment, when the state of charge SOC of the battery 50 is greater than a threshold value Shv1 (e.g. 45%, 50%, or 55%) upon starting the system, the vehicle travels in the CD mode until the state of charge SOC of the battery 50 reaches a threshold value Shv2 (e.g. 25%, 30%, or 35%) or less, while, after the state of charge SOC of the battery 50 reaches the threshold value Shv2 or less, the vehicle travels in the CS mode until the system is stopped. On the other hand, when the state of charge SOC of the battery 50 is less than or equal to the threshold value Shv1 upon starting the system, the vehicle travels in the CS mode until the system is stopped. Incidentally, when the power supply plug 61 is connected to an external electric power source while the system is stopped at a battery charging point such as at home, the battery charger 60 is controlled to charge the battery 50 using electric power from the external electric power source.

The HV drive mode is a mode in which the vehicle travels by operating the engine 22 while the carrier 34 (the engine 22) of the planetary gear 30 is set in a rotatable state. The EV drive mode is a mode in which the vehicle travels by torque from at least the motor MG2 without operating the engine 22 while the carrier 34 (the engine 22) of the planetary gear 30 is set in a rotation restricted state. The EV drive mode includes a single-drive mode in which the vehicle travels only by torque from the motor MG2, and a double-drive mode in which the vehicle travels by torques from the motor MG1 and the motor MG2.

In the HV drive mode and the EV drive mode (single-drive mode, double-drive mode), the engine 22 and the motors MG1 and MG2 are controlled by cooperative control among the HVECU 70, the engine ECU 24, and the motor ECU 40. Hereinbelow, the EV drive mode (single-drive mode, double-drive mode) and the HV drive mode will be described in this order.

Figure 2:
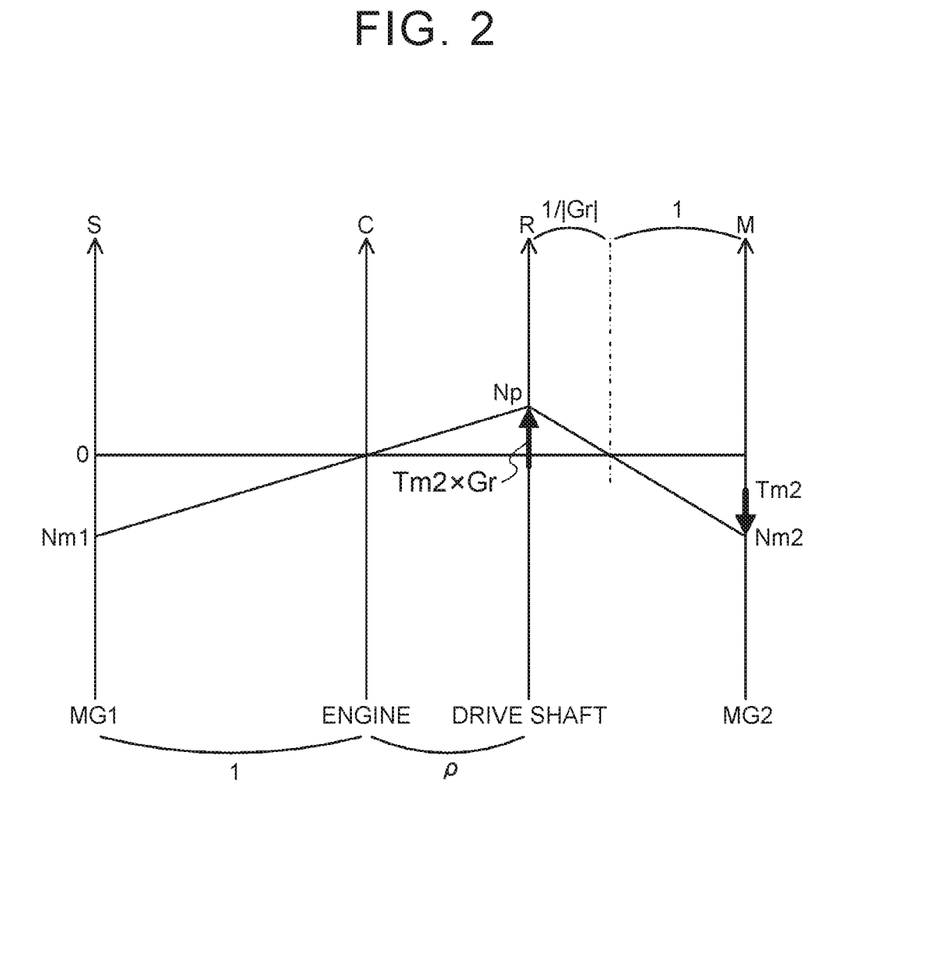
FIG. 2 is an explanatory diagram showing one example of a collinear diagram of a planetary gear in a single-drive mode in the first embodiment.
Figure 3:
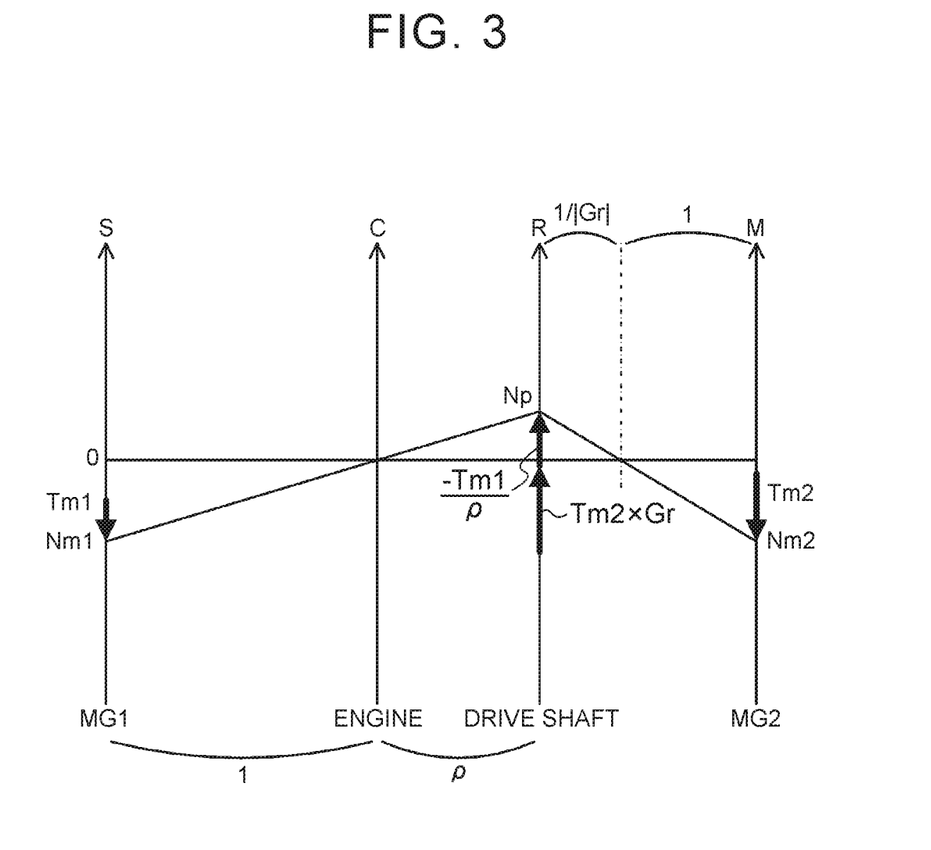
FIG. 3 is an explanatory diagram showing one example of a collinear diagram of the planetary gear in a double-drive mode in the first embodiment.

FIGS. 2 and 3 are explanatory diagrams respectively showing examples of collinear diagrams of the planetary gear 30 in the single-drive mode and the double-drive mode. In FIGS. 2 and 3, an S-axis represents a rotational speed Nm1 of the motor MG1, which is also a rotational speed of the sun gear 31, a C-axis represents a rotational speed Ne of the engine 22, which is also a rotational speed of the carrier 34, an R-axis represents a rotational speed Np of the drive shaft 36, which is also a rotational speed of the ring gear 32, and an M-axis represents a rotational speed Nm2 of the motor MG2, which is also a rotational speed of a gear before reduction of the reduction gear 35. "ρ" represents a gear ratio of the planetary gear 30 (the number of teeth of the sun gear 31/the number of teeth of the ring gear 32), and "Gr" represents a reduction ratio of the reduction gear 35. In FIG. 2, a thick-line arrow on the M-axis represents a torque Tm2 that is output from the motor MG2, and a thick-line arrow on the R-axis represents a torque (Tm2×Gr) that acts on the drive shaft 36 at the time when the torque Tm2 is output from the motor MG2. In FIG. 3, a thick-line arrow on the S-axis represents a torque Tm1 that is output from the motor MG1, a thick-line arrow on the M-axis represents a torque Tm2 that is output from the motor MG2, and two thick-line arrows on the R-axis represent a torque (−Tm1/ρ+Tm2×Gr) that acts on the drive shaft 36 when the torques Tm1 and Tm2 are output from the motors MG1 and MG2.

Hereinbelow, in the collinear diagrams, it is assumed that, with respect to the rotational speed, the side above value 0 in FIGS. 2 and 3 represents positive rotation, while the side below value 0 in FIGS. 2 and 3 represents negative rotation, and that, with respect to the torque, the upward direction in FIGS. 2 and 3 represents a positive torque, while the downward direction in FIGS. 2 and 3 represents a negative torque. In this case, since signs of the rotational speed Nm2 of the motor MG2 and the rotational speed Np of the drive shaft 36 are opposite to each other, the reduction ratio Gr of the reduction gear 35 takes a negative value.

In the single-drive mode, the HVECU 70 first sets a required torque Tp* that is required for a travel based on an accelerator opening degree Acc and a vehicle speed V. Then, a torque command Tm1* of the motor MG1 is set to value 0, and a torque command Tm2* of the motor MG2 is set such that the required torque Tp* is output to the drive shaft 36 in the ranges of input and output limits Win and Wout of the battery 50 and the range of a rated torque Tm2$rt$1 on the negative side (the downward side in FIG. 2) of the motor MG2. Herein, the negative-side rated torque Tm2$rt$1 of the motor MG2 decreases in absolute value as the absolute value of the rotational speed Nm2 of the motor MG2 increases. Then, the HVECU 70 transmits the torque commands Tm1* and Tm2* of the motors MG1 and MG2 to the motor ECU 40. The motor ECU 40 performs switching control of the switching elements of the inverters 41 and 42 such that the motors MG1 and MG2 are driven at the torque commands Tm1* and Tm2*.

Consequently, as shown in FIG. 2, the vehicle can travel by outputting the negative torque Tm2 from the motor MG2 to cause the positive torque (Tm2×Gr) to act on the drive shaft 36. A single-drive maximum torque Tpmax1 that can be output to the drive shaft 36 in the single-drive mode is equal to a value (Tm2$rt$1×Gr) that is obtained by multiplying the negative-side rated torque Tm2$rt$1 of the motor MG2 by the reduction ratio Gr of the reduction gear 35. This can easily be derived from the collinear diagram of FIG. 2. The single-drive maximum torque Tpmax1 decreases as the rotational speed Np of the drive shaft 36 increases.

In the double-drive mode, the HVECU 70 first sets a required torque Tp* that is required for a travel based on an accelerator opening degree Ace and a vehicle speed V. Then, torque commands Tm1* and Tm2* of the motors MG1 and MG2 are set such that the required torque Tp* is output to the drive shaft 36 in the ranges of input and output limits Win and Wout of the battery 50 and the ranges of rated torques Tm1$rt$1 and Tm2$rt$1 on the negative side (the downward side in FIG. 3) of the motors MG1 and MG2. Herein, the negative-side rated torque Tm1$rt$1 of the motor MG1 decreases in absolute value as the absolute value of the rotational speed Nm1 of the motor MG1 increases. Then, the HVECU 70 transmits the torque commands Tm1* and Tm2* of the motors MG1 and MG2 to the motor ECU 40. The motor ECU 40 performs switching control of the switching elements of the inverters 41 and 42 in the manner described above.

Consequently, as shown in FIG. 3, the vehicle can travel by outputting the negative torques Tm1 and Tm2 from the motors MG1 and MG2 to cause the positive torque (−Tm1/ρ+Tm2×Gr) to act on the drive shaft 36. A double-drive maximum torque Tpmax2 that can be output to the drive shaft 36 in the double-drive mode is equal to a sum (−Tm1rt1/ρ+Tm2$rt$1×Gr) of a value that is obtained by multiplying the negative-side rated torque Tm1$rt$1 of the motor MG1 by a reciprocal of the gear ratio ρ of the planetary gear 30 and by a value (−1), and a value that is obtained by multiplying the negative-side rated torque Tm2$rt$1 of the motor MG2 by the reduction ratio Gr of the reduction gear 35. This can easily be derived from the collinear diagram of FIG. 3. The double-drive maximum torque Tpmax2 decreases as the rotational speed Np of the drive shaft 36 increases.

In the first embodiment, in the EV drive mode, when the required torque Tp* is less than or equal to a selection threshold value Tpref that is smaller than the single-drive maximum torque Tpmax1, the single-drive mode is selected, while, when the required torque Tp* is greater than the selection threshold value Tpref, the double-drive mode is selected. The selection threshold value Tpref decreases as the rotational speed Np of the drive shaft 36 increases.

In the first embodiment, in the double-drive mode, the share ratio, between the torque that is output from the motor MG1 and acts on the drive shaft 36 and the torque that is output from the motor MG2 and acts on the drive shaft 36, in the total torque that is output to the drive shaft 36 is adjusted such that the torque from the motor MG2 becomes close to a value (Tpref/Gr) that is obtained by dividing the selection threshold value Tpref between the single-drive mode and the double-drive mode by the reduction ratio Gr of the reduction gear 35 or close to the negative-side rated torque Tm2rt1.

In the HV drive mode, the HVECU 70 first sets a required torque Tp* that is required for a travel based on an accelerator opening degree Acc and a vehicle speed V. Then, a required power Pp* that is required for the travel is calculated by multiplying the set required torque Tp* by a rotational speed Np of the drive shaft 36. Herein, as the rotational speed Np of the drive shaft 36, it is possible to use, for example, a rotational speed that is obtained by dividing a rotational speed Nm2 of the motor MG2 by the reduction ratio Gr of the reduction gear 35, or a rotational speed that is obtained by multiplying the vehicle speed V by a conversion factor. Then, a required power Pe* that is required to the vehicle is calculated by subtracting a charge/discharge required power Pb* of the battery 50 (a positive value when discharged from the battery 50) from the required power Pp*. Then, a target rotational speed Ne* and a target torque Te* of the engine 22 and torque commands Tm1* and Tm2* of the motors MG1 and MG2 are set such that the required power Pe* is output from the engine 22 and that the required torque Tp* is output to the drive shaft 36 in the ranges of input and output limits Win and Wout of the battery 50 and the ranges of negative-side rated torques Tm1rt1 and Tm2rt1 of the motors MG1 and MG2. Then, the HVECU 70 transmits the target rotational speed Ne* and the target torque Te* of the engine 22 to the engine ECU 24 and transmits the torque commands Tm1* and Tm2* of the motors MG1 and MG2 to the motor ECU 40. In response to receipt of the target rotational speed Ne* and the target torque Te* from the HVECU 70, the engine ECU 24 performs intake air amount control, fuel injection control, ignition control, and so on of the engine 22 such that the engine 22 is operated based on the target rotational speed Ne* and the target torque Te*. In response to receipt of the torque commands Tm1* and Tm2* from the HVECU 70, the motor ECU 40 performs switching control of the switching elements of the inverters 41 and 42 in the manner described above.

Figure 4:
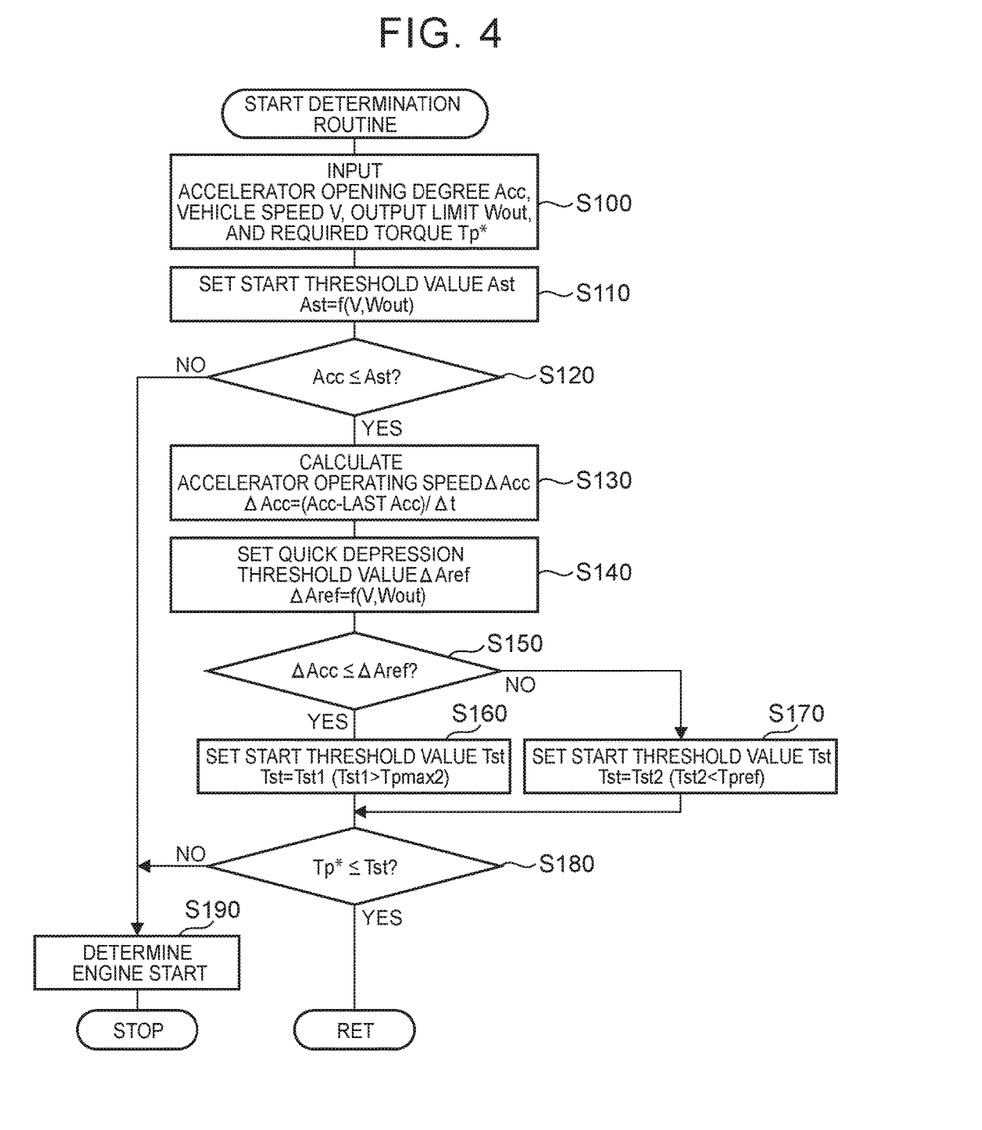
FIG. 4 is a flowchart showing one example of a start determination routine that is executed by a hybrid electronic control unit of the first embodiment.

Next, the operation of the hybrid vehicle 20 of the first embodiment configured as described above, in particular, the operation when determining whether or not to start the engine 22 in the EV drive mode in the CD mode, will be described. FIG. 4 is a flowchart showing one example of a start determination routine that is executed by the HVECU 70 of the first embodiment. This routine is repeatedly executed in the EV drive mode (when a start determination of the engine 22 is not made).

When the start determination routine of FIG. 4 is executed, the HVECU 70 first receives data such as an accelerator opening degree Acc, a vehicle speed V, an output limit Wout of the battery 50, and a required torque Tp* (step S100). Herein, a value that is detected by the accelerator pedal position sensor 84 is input as the accelerator opening degree Acc, a value that is detected by the vehicle speed sensor 88 is input as the vehicle speed V, a value that is computed by the battery ECU 52 is input as the output limit Wout of the battery 50, and a value that is set by the above-described control is input as the required torque Tp*.

After the data are input as described above, a start threshold value Ast of the engine 22 for the accelerator opening degree Acc is set based on the input vehicle speed V and the input output limit Wout of the battery 50 (step S110). Herein, in the first embodiment, the relationship of a start threshold value Ast with respect to a vehicle speed V and an output limit Wout of the battery 50 is determined in advance and stored as a map such that when a vehicle speed V and an output limit Wout of the battery 50 are given, a corresponding start threshold value Ast is derived from the map and set. The start threshold value Ast is set to be smaller when the vehicle speed V is high than when the vehicle speed V is low, and is set to be smaller when the output limit Wout of the battery 50 is small than when the output limit Wout of the battery 50 is large. Specifically, the start threshold value Ast is set such that it tends to decrease as the vehicle speed V increases, and to decrease as the output limit Wout of the battery 50 decreases. It is possible to use, for example, a value of about 60% to 80% as the start threshold value Ast.

Then, the accelerator opening degree Acc and the start threshold value Ast are compared to each other (step S120), and when the accelerator opening degree Acc is greater than the start threshold value Ast, it is determined to start the engine 22 (step S190), and this routine is terminated.

Figure 5:
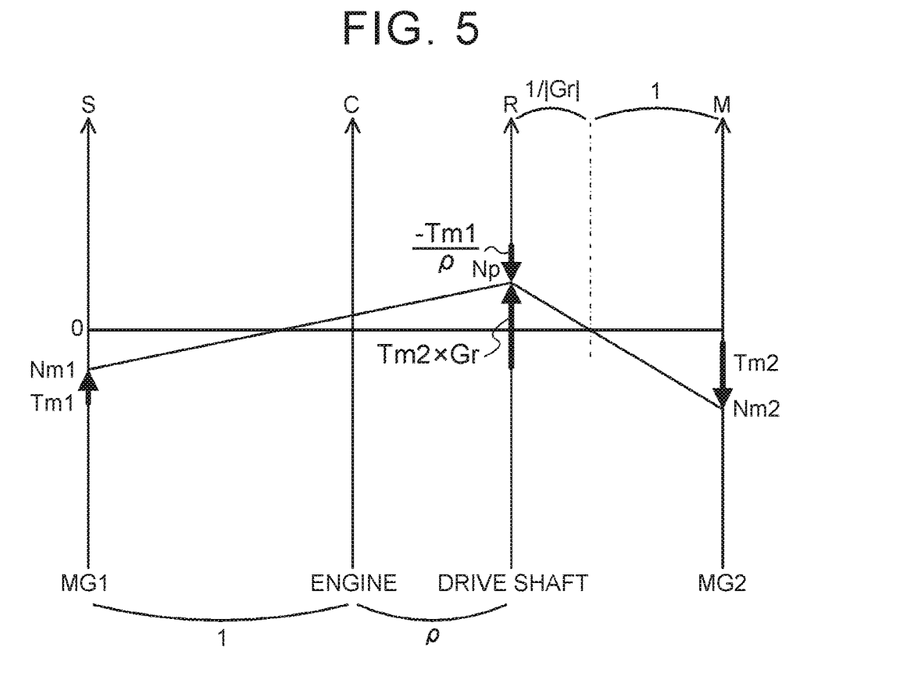
FIG. 5 is an explanatory diagram showing one example of a collinear diagram of the planetary gear when starting an engine in the first embodiment.

When it is determined to start the engine 22, the engine 22 is started by cooperative control among the HVECU 70, the engine ECU 24, and the motor ECU 40. FIG. 5 is an explanatory diagram showing one example of a collinear diagram of the planetary gear 30 when starting the engine 22. As shown in FIG. 5, when cranking the engine 22, a positive torque Tm1 for cranking the engine 22 is output from the motor MG1 in the ranges of input and output limits Win and Wout of the battery 50 and the ranges of a positive-side rated torque Tm1rt2 of the motor MG1 and a negative-side rated torque Tm2rt1 of the motor MG2, and a torque that is obtained by dividing a positive torque (Tcr+Tp*), as a sum of a cancel torque Tcr for canceling a torque (−Tm1/ρ) that is output from the motor MG1 and acts on the drive shaft 36 and the required torque Tp*, by the reduction ratio Gr of the reduction gear 35 is output from the motor MG2. When the engine 22 is cranked in this way so that the rotational speed Ne of the engine 22 becomes greater than a predetermined rotational speed (e.g. 800 rpm or 1000 rpm), operation control (fuel injection control, ignition control, etc.) of the engine 22 is started. Then, when the start of the engine 22 is completed, the drive mode is shifted to the HV drive mode.

When the accelerator opening degree Acc is less than or equal to the start threshold value Ast at step S120, a value that is obtained by subtracting a last accelerator opening degree (last Acc) from the accelerator opening degree Acc is divided by an execution interval Δt of this routine, thereby calculating an accelerator operating speed ΔAcc as an increase amount per unit time of the accelerator opening degree Acc (step S130).

Then, a quick depression threshold value ΔAref for determining whether or not quick depression of the accelerator pedal 83 takes place is set based on the vehicle speed V and the output limit Wout of the battery 50 (step S140). Herein, in the first embodiment, the relationship of a quick depression threshold value ΔAref with respect to a vehicle speed V and an output limit Wout of the battery 50 is determined in advance and stored as a map in a ROM (not shown) such that when a vehicle speed V and an output limit Wout of the battery 50 are given, a corresponding quick depression threshold value ΔAref is derived from the map and set. The quick depression threshold value ΔAref is set to be smaller when the vehicle speed V is high than when the vehicle speed V is low, and is set to be smaller when the output limit Wout of the battery 50 is small than when the output limit Wout of the battery 50 is large. Specifically, the quick depression threshold value ΔAref is set such that it tends to decrease as the vehicle speed V increases, and to decrease as the output limit Wout of the battery 50 decreases. It is possible to use, for example, a value of about 0.5%/10 msec to 1.5%/10 msec as the quick depression threshold value ΔAref.

After the accelerator operating speed ΔAcc and the quick depression threshold value ΔAref are set as described above, the accelerator operating speed ΔAcc and the quick depression threshold value ΔAref are compared to each other (step S150). When the accelerator operating speed ΔAcc is less than or equal to the quick depression threshold value ΔAref, it is determined that quick depression of the accelerator pedal 83 does not take place, and a start threshold value Tst of the engine 22 for the required torque Tp* is set to a value Tst1 (step S160). Herein, in the first embodiment, a value that is slightly greater than a double-drive maximum torque Tpmax2 is used as the value Tst1. The value Tst1 decreases as the rotational speed Np of the drive shaft 36 increases.

Then, the required torque Tp* is compared to the start threshold value Tst (step S180) and, when the required torque Tp* is less than or equal to the start threshold value Tst, it is determined to continue the EV drive mode, and this routine is terminated, while, when the required torque Tp* becomes greater than the start threshold value Tst, it is determined to start the engine 22 (step S190), and this routine is terminated. Since consideration is now being given to the case where the start threshold value Tst is set to the value Tst1, when the required torque Tp* becomes greater than the start threshold value Tst (=Tst1) in the double-drive mode, the engine 22 is started so that the drive mode is shifted to the HV drive mode.

When the accelerator operating speed ΔAcc is greater than the quick depression threshold value ΔAref at step S150, it is determined that quick depression of the accelerator pedal 83 takes place, and the start threshold value Tst is set to a value Tst2 (step S170). Then, step S180 and subsequent processing are executed. Herein, in the first embodiment, a value that is slightly smaller than a selection threshold value Tpref between the single-drive mode and the double-drive mode is used as the value Tst2. Like the value Tst1, the value Tst2 decreases as the rotational speed Np of the drive shaft 36 increases. Therefore, when the required torque Tp* becomes greater than the start threshold value Tst (=Tst2) in the single-drive mode, the engine 22 is started so that the drive mode is shifted to the HV drive mode.

Herein, the reason for setting the start threshold value Tst to the value Tst1 that is greater than the double-drive maximum torque Tpmax2 when the accelerator operating speed ΔAcc is less than or equal to the quick depression threshold value ΔAref, and for setting the start threshold value Tst to the value Tst2 that is smaller than the selection threshold value Tpref between the single-drive mode and the double-drive mode when the accelerator operating speed ΔAcc is greater than the quick depression threshold value ΔAref will be described.

Figure 6:
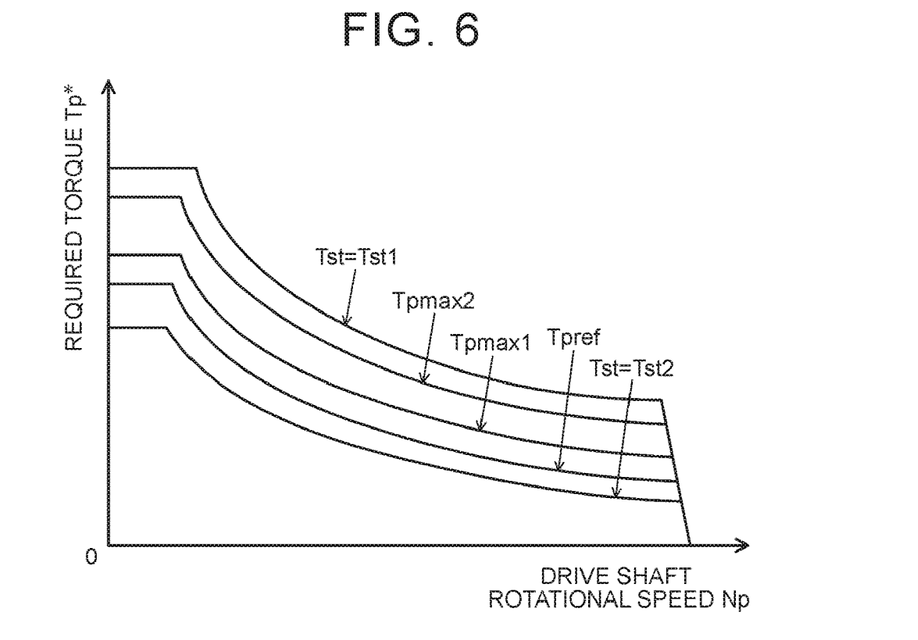
FIG. 6 is an explanatory diagram showing one example of the relationship between a single-drive maximum torque, a double-drive maximum torque, a selection threshold value between the single-drive mode and the double-drive mode, and a start threshold value in the hybrid vehicle of the first embodiment.

FIG. 6 is an explanatory diagram showing one example of the relationship between the single-drive maximum torque Tpmax1, the double-drive maximum torque Tpmax2, the selection threshold value Tpref between the single-drive mode and the double-drive mode, and the start threshold value Tst (value Tst1 or value Tst2). As shown in FIG. 6, the values are the value Tst1, the double-drive maximum torque Tpmax2, the single-drive maximum torque Tpmax1, the selection threshold value Tpref, and the value Tst2 in this order from the greater value side.

Since consideration is now being given to the case of the EV drive mode in the CD mode, the EV drive mode is required to be given priority more than in the CS mode. When the accelerator operating speed ΔAcc is less than or equal to the quick depression threshold value ΔAref, since the value Tst1 that is greater than the double-drive maximum torque Tpmax2 is set as the start threshold value Tst, the start of the engine 22, i.e. the shift from the EV drive mode to the HV drive mode, can be more suppressed.

However, when the value Tst1 is used as the start threshold value Tst, the engine 22 is started from the double-drive mode. As can be seen from FIGS. 3 and 5, when starting the engine 22 from the double-drive mode, since torque from the motor MG1 is switched from negative to positive, torque that is output from the motor MG1 and acts on the drive shaft 36 is switched from positive to negative so that there is a possibility that total positive torque that is output to the drive shaft 36 may decrease somewhat largely. If such a phenomenon occurs when quick depression of the accelerator pedal 83 is carried out, a driver is likely to feel slowness. Further, in the double-drive mode, since torque from the motor MG2 is close to the value (Tpref/Gr) that is obtained by dividing the selection threshold value Tpref between the single-drive mode and the double-drive mode by the reduction ratio Gr of the reduction gear 35 or close to the negative-side rated torque Tm2rt1, there is a case where it is not possible to cause the cancel torque Tcr to act on the drive shaft 36 from the motor MG2. In this case, there is a possibility of making the driver feel slowness more (making the driver feel slowness for a long time).

In the first embodiment, when the accelerator operating speed ΔAcc is greater than the quick depression threshold value ΔAref, it is determined that quick depression of the accelerator pedal 83 takes place, and the start threshold value Tst is set to the value Tst2. Consequently, when the current drive mode is the single-drive mode, the engine 22 is started from the single-drive mode when the required torque Tp* becomes greater than the start threshold value Tst. As can be seen from FIGS. 2 and 5, when starting the engine 22 from the single-drive mode, torque from the motor MG1 is switched from value 0 to positive. Accordingly, compared to the case where the torque from the motor MG1 is switched from negative to positive, it is possible to suppress, when starting the engine 22, a reduction in total positive torque that is output to the drive shaft 36. As a result, it is possible to suppress making the driver feel slowness when quick depression of the accelerator pedal 83 is carried out. If the value Tst2 is set to a value that is smaller than the single-drive maximum torque Tpmax1 to a degree that can cause the cancel torque Tcr to act on the drive shaft 36 from the motor MG2, it is possible to suppress more sufficiently a reduction in total positive torque that is output to the drive shaft 36, and thus it is possible to further suppress making the driver feel slowness.

In the hybrid vehicle 20 of the first embodiment described above, when the accelerator operating speed ΔAcc is greater than the quick depression threshold value ΔAref in the EV drive mode in the CD mode, the start threshold value Tst is set to the value Tst2 that is smaller than the selection threshold value Tpref between the single-drive mode and the double-drive mode. Consequently, when the current drive mode is the single-drive mode, the engine 22 is started from the single-drive mode when the required torque Tp* becomes greater than the start threshold value Tst. As a result, compared to the case where the engine 22 is started from the double-drive mode, it is possible to suppress making the driver feel slowness when quick depression of the accelerator pedal 83 is carried out.

In the hybrid vehicle 20 of the first embodiment, the description has been given of the operation when determining whether or not to start the engine 22 in the EV drive mode in the CD mode. After starting the engine 22 to shift to the HV drive mode, it may be configured that, for example, when the required torque Tp* becomes less than or equal to the value Tst2, the engine 22 is stopped to shift to the EV drive mode. With this configuration, depending on whether or not the accelerator operating speed ΔAcc is greater than the quick depression threshold value ΔAref thereafter, it is possible to deal with it by switching the start threshold value Tst.

In the hybrid vehicle 20 of the first embodiment, the description has been given of the operation when determining whether or not to start the engine 22 in the EV drive mode in the CD mode. In the EV drive mode in the CS mode, it may be configured that, for example, the start threshold value Tst is set to the value Tst2 regardless of a magnitude relation between the accelerator operating speed ΔAcc and the quick depression threshold value ΔAref and, when the required torque Tp* becomes greater than the start threshold value Tst, the engine 22 is started to shift to the HV drive mode. The state of charge SOC of the battery 50 is often lower in the CS mode than in the CD mode. Therefore, by setting the start threshold value Tst in this way, it is possible to suppress a reduction in the state of charge SOC of the battery 50.

In the hybrid vehicle 20 of the first embodiment, the description has been given of the operation when determining whether or not to start the engine 22 in the EV drive mode in the CD mode. In the case where there is no selection between the CD mode and the CS mode (e.g. a hybrid vehicle including no battery charger 60), it may be configured that whether or not to start the engine 22 is constantly determined in the EV drive mode as in the first embodiment.

In the hybrid vehicle 20 of the first embodiment, the selection threshold value Tpref between the single-drive mode and the double-drive mode is set to a value that is smaller than the single-drive maximum torque Tpmax1. However, the selection threshold value Tpref may be set to a value that is equal to the single-drive maximum torque Tpmax1.

In the hybrid vehicle 20 of the first embodiment, the start threshold value Ast is set based on the vehicle speed V and the output limit Wout of the battery 50. However, the start threshold value Ast may be set based only on the vehicle speed V or may be set based only on the output limit Wout of the battery 50, or a fixed value may be used as the start threshold value Ast.

In the hybrid vehicle 20 of the first embodiment, in the EV drive mode, when the accelerator opening degree Acc is greater than the start threshold value Ast, it is determined to start the engine 22, while, when the accelerator opening degree Acc is less than or equal to the start threshold value Ast, the start threshold value Tst is set according to a magnitude relation between the accelerator operating speed ΔAcc and the quick depression threshold value ΔAref and, when the required torque Tp* is greater than the start threshold value Tst, it is determined to start the engine 22. However, the start threshold value Tst may be set according to a magnitude relation between the accelerator operating speed ΔAcc and the quick depression threshold value ΔAref regardless of the accelerator opening degree Acc (even when the accelerator opening degree Acc is greater than the start threshold value Ast), and it may be determined to start the engine 22 when the required torque Tp* is greater than the start threshold value Tst.

In the hybrid vehicle 20 of the first embodiment, the quick depression threshold value ΔAref is set based on the vehicle speed V and the output limit Wout of the battery 50. However, the quick depression threshold value ΔAref may be set based only on the vehicle speed V or may be set based only on the output limit Wout of the battery 50, or a fixed value may be used as the quick depression threshold value ΔAref.

In the hybrid vehicle 20 of the first embodiment, when the accelerator operating speed ΔAcc is less than or equal to the quick depression threshold value ΔAref, the start threshold value Tst is set to the value Tst1 that is greater than the double-drive maximum torque Tpmax2. However, when the accelerator operating speed ΔAcc is less than or equal to the quick depression threshold value ΔAref, the start threshold value Tst may be set to a value that is equal to the double-drive maximum torque Tpmax2, or may be set to a value that is smaller than the double-drive maximum torque Tpmax2 and greater than the selection threshold value Tpref between the single-drive mode and the double-drive mode.

In the hybrid vehicle 20 of the first embodiment, when the accelerator operating speed ΔAcc is greater than the quick depression threshold value ΔAref, the start threshold value Tst is set to a value that is smaller than the selection threshold value Tpref between the single-drive mode and the double-drive mode. However, when the accelerator operating speed ΔAcc is greater than the quick depression threshold value ΔAref, the start threshold value Tst may be set to a value that is equal to the selection threshold value Tpref.

Figure 7:
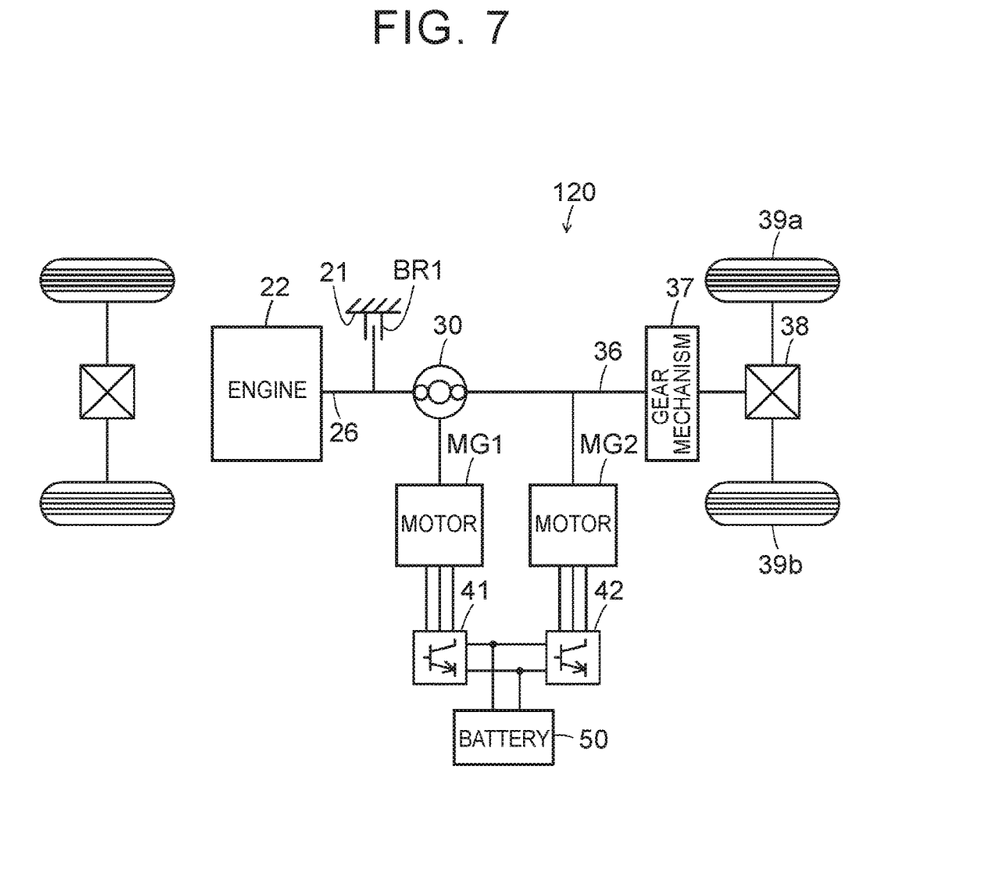
FIG. 7 is a configuration diagram schematically showing a configuration of a hybrid vehicle of a second embodiment of the present disclosure.

In the hybrid vehicle 20 of the first embodiment, the one-way clutch CL1 is attached to the crankshaft 26 of the engine 22 (the carrier 34 of the planetary gear 30). However, as shown in a hybrid vehicle 120 of a second embodiment of FIG. 7, there may be provided a brake BR1 that serves to non-rotatably fix (connect) a crankshaft 26 of an engine 22 relative to a case 21 and to rotatably release the crankshaft 26 of the engine 22 relative to the case 21. In this case, in an EV drive mode, the brake BR1 may be placed in an engaged state to set the engine 22 in a rotation restricted state. On the other hand, in an HV drive mode, the brake BR1 may be placed in a released state to set the engine 22 in a rotatable state.

In the hybrid vehicle 20 of the first embodiment, the motor MG2 is connected to the drive shaft 36 via the reduction gear 35. However, the motor MG2 may be directly connected to the drive shaft 36. Alternatively, the motor MG2 may be connected to the drive shaft 36 via a transmission.

In the hybrid vehicle 20 of the first embodiment, the planetary gear set includes the single planetary gear 30. However, a planetary gear set may include a plurality of planetary gears. In this case, the configuration shown in a hybrid vehicle 220 of a third embodiment of FIG. 8 may be employed.

Figure 8:
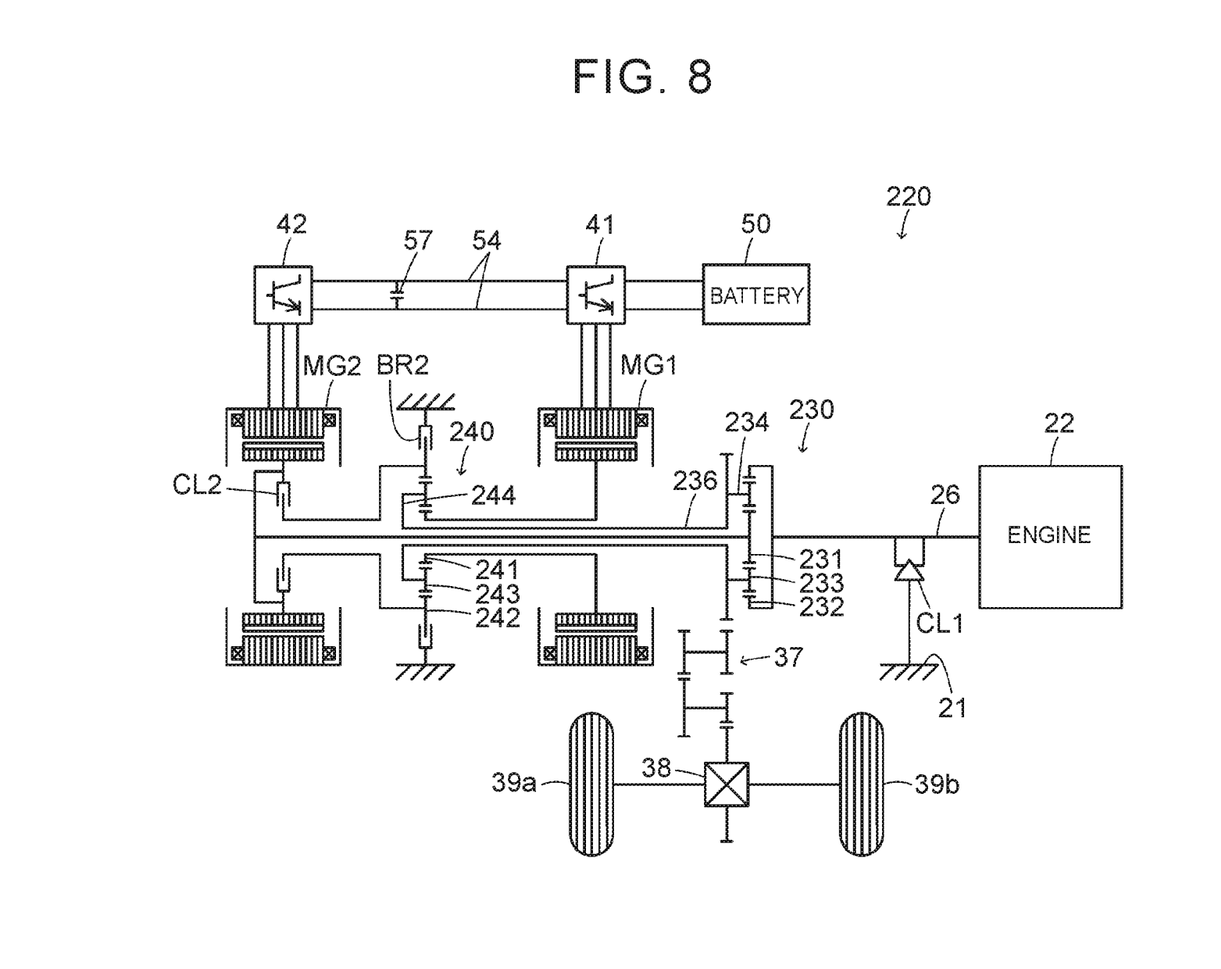
FIG. 8 is a configuration diagram schematically showing a configuration of a hybrid vehicle of a third embodiment of the present disclosure.

The hybrid vehicle 220 of the third embodiment of FIG. 8 includes planetary gears 230 and 240 as a planetary gear set instead of the planetary gear 30 of the hybrid vehicle 20, a clutch CL2 and a brake BR2.

The planetary gear 230 is configured as a single-pinion type planetary gear and includes an external-tooth sun gear 231, an internal-tooth ring gear 232, a plurality of pinions 233 meshing with the sun gear 231 and the ring gear 232, and a carrier 234 holding the pinions 233 in such a way as to allow them to rotate on their own axes and around the sun gear 231. A rotor of a motor MG2 is connected to the sun gear 231. A crankshaft 26 of an engine 22 is connected to the ring gear 232. A drive shaft 236 coupled to drive wheels 39a and 39b via a differential gear 38 and a gear mechanism 37 is connected to the carrier 234.

The planetary gear 240 is configured as a single-pinion type planetary gear and includes an external-tooth sun gear 241, an internal-tooth ring gear 242, a plurality of pinions 243 meshing with the sun gear 241 and the ring gear 242, and a carrier 244 holding the pinions 243 in such a way as to allow them to rotate on their own axes and around the sun gear 241. A rotor of a motor MG1 is connected to the sun gear 241. The drive shaft 236 is connected to the carrier 244.

The clutch CL2 serves to establish connection between the sun gear 231 of the planetary gear 230/the rotor of the motor MG2 and the ring gear 242 of the planetary gear 240 and to release the connection therebetween. The brake BR2 serves to non-rotatably fix (connect) the ring gear 242 of the planetary gear 240 relative to a case 21 and to rotatably release the ring gear 242 relative to the case 21.

Figure 9:
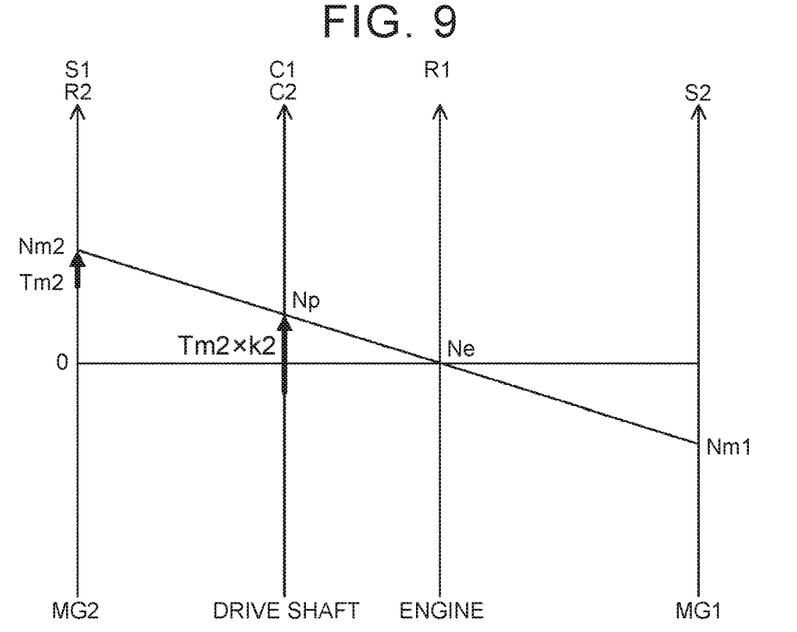
FIG. 9 is an explanatory diagram showing one example of a collinear diagram of two planetary gears in a single-drive mode when a clutch is in an engaged state and a brake is in a released state in the third embodiment.
Figure 10:
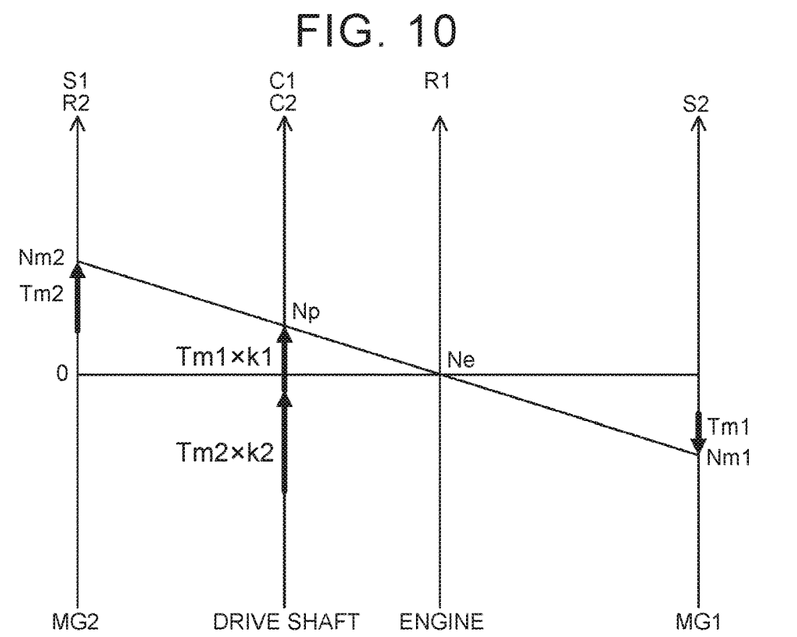
FIG. 10 is an explanatory diagram showing one example of a collinear diagram of the two planetary gears in a double-drive mode when the clutch is in the engaged state and the brake is in the released state in the third embodiment.
Figure 11:
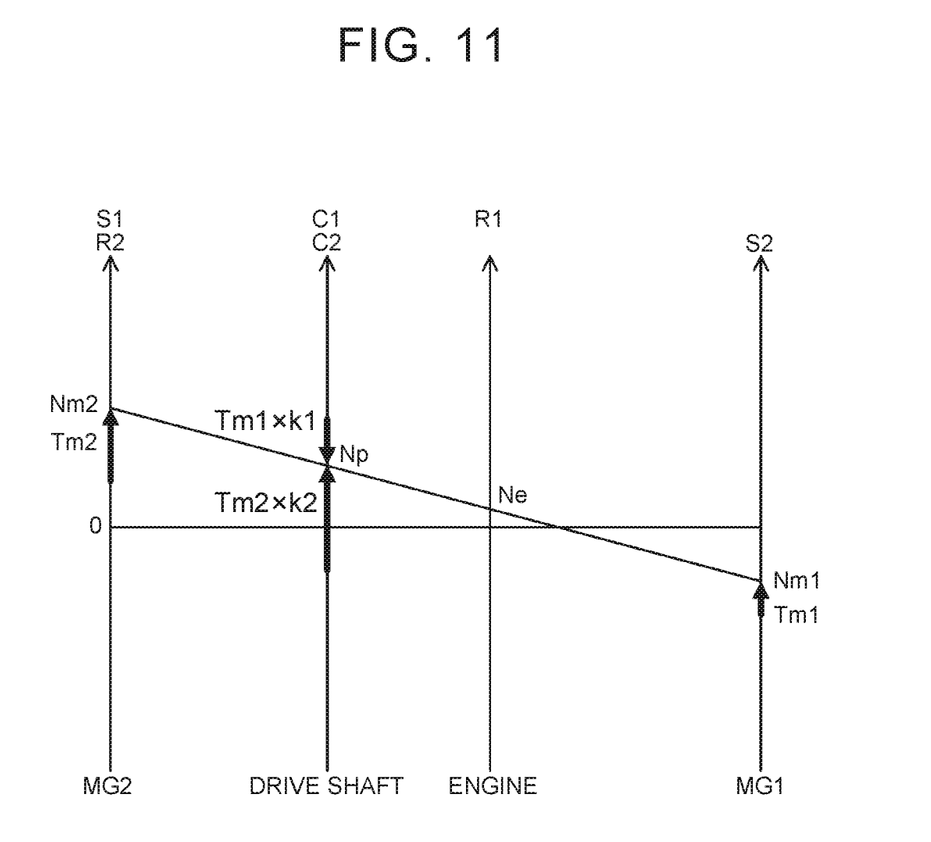
FIG. 11 is an explanatory diagram showing one example of a collinear diagram of the two planetary gears when starting an engine while the clutch is in the engaged state and the brake is in the released state in the third embodiment.

FIGS. 9 to 11 are explanatory diagrams respectively showing examples of collinear diagrams of the planetary gears 230 and 240 in a single-drive mode, in a double-drive mode, and when starting the engine 22 while the clutch CL2 is placed in an engaged state and the brake BR2 is placed in a released state in the hybrid vehicle 220 of the third embodiment.

In FIGS. 9 to 11, an S1-R2-axis represents a rotational speed Nm2 of the motor MG2, which is also a rotational speed of the sun gear 231 of the planetary gear 230 and a rotational speed of the ring gear 242 of the planetary gear 240, a C1-C2-axis represents a rotational speed Np of the drive shaft 236, which is also a rotational speed of the carriers 234 and 244 of the planetary gears 230 and 240, an R1-axis represents a rotational speed Ne of the engine 22, which is also a rotational speed of the ring gear 232 of the planetary gear 230, and an S2-axis represents a rotational speed Nm1 of the motor MG1, which is also a rotational speed of the sun gear 241 of the planetary gear 240.

In FIG. 9, a thick-line arrow on the S1-R2-axis represents a torque Tm2 that is output from the motor MG2, and a thick-line arrow on the C1-C2-axis represents a torque (Tm2×k2) that is output from the motor MG2 and acts on the drive shaft 236. A conversion factor k2 is a factor for converting the torque Tm2 of the motor MG2 to a torque of the drive shaft 236. In FIGS. 10 and 11, a thick-line arrow on the S2-axis represents a torque Tm1 that is output from the motor MG1, a thick-line arrow on the S1-R2-axis represents a torque Tm2 that is output from the motor MG2, and two thick-line arrows on the C1-C2-axis represent a torque (Tm1×k1+Tm2×k2) that is output from the motors MG1 and MG2 and acts on the drive shaft 236. A conversion factor k1 is a factor for converting the torque Tm1 of the motor MG1 to a torque of the drive shaft 236.

In the case of FIGS. 9 to 11, since the clutch CL2 is placed in the engaged state, the rotational speed of the sun gear 231 of the planetary gear 230, the rotational speed Nm2 of the motor MG2, and the rotational speed of the ring gear 242 of the planetary gear 240 are equal to each other. Therefore, the planetary gears 230 and 240 function as a so-called four-element type planetary gear set.

In the single-drive mode, as shown in FIG. 9, the vehicle can travel by outputting the positive torque Tm2 from the motor MG2 to cause the positive torque (Tm2×k2) to act on the drive shaft 236. A single-drive maximum torque Tpmax1 is equal to a value (Tm2rt2×k2) that is obtained by multiplying a positive-side rated torque Tm2rt2 of the motor MG2 by the conversion factor k2. This can easily be derived from the collinear diagram of FIG. 9.

In the double-drive mode, as shown in FIG. 10, the vehicle can travel by outputting the negative torque Tm1 from the motor MG1 and the positive torque Tm2 from the motor MG2 to cause the positive torque (Tm1×k1+Tm2×k2) to act on the drive shaft 236. A double-drive maximum torque Tpmax2 is equal to a sum (Tm1rt1×k1+Tm2rt2×k2) of a value that is obtained by multiplying a negative-side rated torque Tm1rt1 of the motor MG1 by the conversion factor k1, and a value that is obtained by multiplying a positive-side rated torque Tm2rt2 of the motor MG2 by the conversion factor k2. This can easily be derived from the collinear diagram of FIG. 10.

When starting the engine 22, as shown in FIG. 11, the positive torque Tm1 is output from the motor MG1 to crank the engine 22. As can be seen from FIGS. 10 and 11, when starting the engine 22 from the double-drive mode, the torque from the motor MG1 is switched from negative to positive, and the torque that is output from the motor MG1 and acts on the drive shaft 236 is switched from positive to negative. Therefore, there is a possibility that the total positive torque that is output to the drive shaft 236 may decrease somewhat largely. In view of this, as in the first embodiment, by executing the start determination routine of FIG. 4 to set a start threshold value Tst to a value Tst2 that is smaller than a selection threshold value Tpref between the single-drive mode and the double-drive mode when an accelerator operating speed ΔAcc is greater than a quick depression threshold value ΔAref, it is possible to obtain the same effect as in the first embodiment.

The correspondence relationship between the main components of the first embodiment and the main components of the present disclosure described in the column of SUMMARY will be described. In the first embodiment, the engine 22 is one example of an "engine". The motor MG1 is one example of a "first motor". The planetary gear 30 is one example of a "planetary gear set". The motor MG2 is one example of a "second motor". The one-way clutch CL1 is one example of a "rotation restriction mechanism". The battery 50 is one example of a "battery". The HVECU 70, the engine ECU 24, and the motor ECU 40 are one example of an "electronic control unit". Further, the HVECU 70 that executes the start determination routine of FIG. 4 is also one example of an "electronic control unit".

The correspondence relationship between the main components of the first embodiment and the main components of the present disclosure described in the column of SUM- MARY is only one example for specifically explaining a mode of the first embodiment for carrying out the present disclosure described in the column of SUMMARY, and thus does not limit the components of the present disclosure described in the column of SUMMARY. That is, the present disclosure described in the column of SUMMARY should be interpreted based on the description in the column of SUMMARY, and the first embodiment is merely one specific example of the present disclosure described in the column of SUMMARY.

While the modes for carrying out the present disclosure have been described with reference to the embodiments, the present disclosure is by no means limited to those embodiments and can of course be carried out in various modes within a range not departing from the gist of the present disclosure.

The present disclosure is applicable to the manufacturing industry of the hybrid vehicle 20, and so on.

What is claimed is:

1. A hybrid vehicle comprising:
    an engine;
    a first motor;
    a planetary gear set including at least one planetary gear, at least part of rotating elements of the at least one planetary gear being connected to the engine, the first motor and a drive shaft such that the first motor, the engine and the drive shaft are arranged in this order in a nomograph, the drive shaft being coupled to an axle;
    a second motor mechanically coupled to the drive shaft;
    a rotation restriction mechanism configured to restrict rotation of the engine;
    a battery configured to exchange electric power with the first motor and the second motor; and
    an electronic control unit configured to:
    (i) control the engine, the first motor, and the second motor in any one of a plurality of drive modes including a hybrid drive mode and an electric drive mode, so as to travel the hybrid vehicle by using a required torque that is required for the drive shaft in response to an accelerator operation amount, the hybrid drive mode being a mode in which the hybrid vehicle travels while the engine is placed in a rotating state to cause the engine to operate, and the electric drive mode being a mode in which the hybrid vehicle travels by using torque from at least the second motor while the engine is placed in a rotation stopped state to cause the engine not to operate,
    (ii) select a single-drive mode in the electric drive mode when the required torque is smaller than or equal to a selection threshold value smaller than or equal to a first maximum torque that is outputtable to the drive shaft in the single-drive mode, and select a double-drive mode in the electric drive mode when the required torque is larger than the selection threshold value, the single-drive mode being a mode in which the hybrid vehicle travels by using torque from only the second motor and the double-drive mode being a mode in which the hybrid vehicle travels by using torque from the first motor and the second motor,
    (iii) control the hybrid vehicle so as to crank the engine to be started by using torque from the first motor when the required torque becomes larger than a start threshold value in the electric drive mode, and
    (iv) set the start threshold value to a value that is smaller than or equal to the selection threshold value when an accelerator operating speed as an increase amount per unit time of the accelerator operation amount is greater than a predetermined speed, the predetermined speed is based on an output limit of the battery.

2. The hybrid vehicle according to claim 1, wherein the electronic control unit is configured to set the start threshold value to a value that is larger than the selection threshold value, when the accelerator operating speed is less than or equal to the predetermined speed.

3. The hybrid vehicle according to claim 2, wherein the electronic control unit is configured to set the start threshold value to a value that is larger than a second maximum torque that is output to the drive shaft in the double-drive mode, when the accelerator operating speed is less than or equal to the predetermined speed.

4. The hybrid vehicle according to claim 1, wherein the electronic control unit is configured to calculate the output limit of the battery based on a state of charge of the battery, the output limit of the battery is an amount of electric power that may be discharged from the battery.

\* \* \* \* \*

UNITED STATES PATENT AND TRADEMARK OFFICE
CERTIFICATE OF CORRECTION

PATENT NO. : 10,442,424 B2
APPLICATION NO. : 15/369141
DATED : October 15, 2019
INVENTOR(S) : Koji Hokoi, Koji Yoshihara and Koji Yamamoto It is certified that error appears in the above-identified patent and that said Letters Patent is hereby corrected as shown below:

In the Specification

In Column 5, Line 37, delete "0m2" and insert --θm2--, therefor.

In Column 8, Line 40, delete "Ace" and insert --Acc--, therefor.

Signed and Sealed this
Twenty-fourth Day of December, 2019

Andrei Iancu
*Director of the United States Patent and Trademark Office*